United States Patent [19]
Bade et al.

[11] Patent Number: 5,894,557
[45] Date of Patent: *Apr. 13, 1999

[54] FLEXIBLE POINT-TO-POINT PROTOCOL FRAMEWORK

[75] Inventors: Steve Allen Bade; Kyusun Chang, both of Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/625,652

[22] Filed: Mar. 29, 1996

[51] Int. Cl.[6] .................... G06F 13/00; G06F 15/17
[52] U.S. Cl. ............... 395/200.58; 395/681; 395/685
[58] Field of Search .................. 395/200.6, 200.66, 395/200.8, 200.57, 200.59, 681, 685, 200.58

[56] References Cited

U.S. PATENT DOCUMENTS

| | | | |
|---|---|---|---|
| 5,142,528 | 8/1992 | Kobayashi et al. | 370/469 |
| 5,224,098 | 6/1993 | Bird et al. | 395/500 |
| 5,243,592 | 9/1993 | Perlman et al. | 370/252 |
| 5,251,205 | 10/1993 | Callon et al. | 370/392 |
| 5,351,237 | 9/1994 | Shinohara et al. | 370/392 |
| 5,412,660 | 5/1995 | Chen et al. | 370/318 |
| 5,448,566 | 9/1995 | Richter et al. | 370/431 |
| 5,485,460 | 1/1996 | Schrier et al. | 395/200.57 |
| 5,579,316 | 11/1996 | Venters et al. | 370/94.1 |
| 5,666,362 | 9/1997 | Chen et al. | 370/420 |

OTHER PUBLICATIONS

Oney, Walter "Programmers Bookshelf", Dr.Dobb's Journal, Sep. 1994: 4 pages. Dr.Dobb's Journal on CD-ROM.
The x-Kernel: An Architecture for Implementing Network Protocols, IEEEE Transactions on Software Engineering, vol. 17, No. 1, Jan. 1991., Norman C. Hutchinson and Larry L. Petersoc.

*Primary Examiner*—Dung C. Dinh
*Attorney, Agent, or Firm*—Jeffrey S. LaBaw

[57] ABSTRACT

It is an object of the invention to minimize the efforts required to integrate a new communication media and network service into an operating system. These and other objects are accomplished by implementing the link control protocol layer as an operating system service multiplexing a set of network protocol connections to a set of communication media connections routing messages between respective connections. The LCP function is isolated by a set of network interfaces and a set of communication media interfaces. The invention allows the NCP and datagram support to be independent of the LCP support so long as the NCP and datagram implementations conform to the interfaces provided by the LCP operating system service that allow exchanges of state information. Also, the LCP operating system service allows the addition of new types of physical communication media support to the PPP subsystem of the present invention with knowledge only of the interfaces to the LCP layer and the framing characteristics of the communications medium. Further, because the LCP layer is now isolated by the interfaces, enhancements to the LCP layer become accessible to all communications media as well as to the NCP and datagram protocols without impact to the media or network layers.

9 Claims, 7 Drawing Sheets

FLEXIBLE POINT-TO-POINT PROTOCOL FRAMEWORK

BACKGROUND OF THE INVENTION

This invention relates generally to data communication on computer networks and computer protocols which facilitate such communication. More particularly, it relates to techniques for decoupling a Point-to-Point Protocol (PPP) implementation both from the device driver which interacts with the communication media coupled to the network and from the network protocol layer, e.g., TCP/IP, which utilizes the services provided by the Point-to-Point Protocol.

In the very early days of computing, computer systems were standalone processors to which peripheral devices such as displays and printers and input devices were connected. Each computer system was independent and there was little communication between computer systems. Today, it is well known to interconnect computer systems in computer networks such as local area networks or wide area networks to achieve a variety of benefits including the sharing of data, services and resources available from the various computer systems coupled to the networks.

To communicate between the different computer systems along a network, many communication protocols have been developed. Some examples of well-known network protocols include the System Network Architecture (SNA), Transmission Control Protocol/Internet Protocol (TCP/IP), Network Basic Input Output System (NetBIOS), and Internet Packet Exchange/Sequence Packet Exchange (IPX/SPX). Other communication protocols are known and widely used. Because of the dynamic nature of the link in wide area network (WAN), different protocols with telecommunications links are used such as the Point-to-Point Protocol (PPP) which is the subject of the present invention is a well known protocol for encapsulating a network protocol over a point-to-point link in a wide area network. The PPP is described in RFC 1332 and RFC 1661 of the Internet Engineering Task Force (IETF) both of which are incorporated by reference.

The functions and associated software in a local area network are often described as a series of layers. Data transfer between one copy of a distributed application over the network to another copy of the distributed application is accomplished by using the services of an underlying series of communication layers. Generally, each layer in one computer system has a counterpart layer in the receiving computer system so that each layer communicates with respective peer layers.

The seven layer Open Systems Interconnect (OSI) model is one of the best known descriptions of local area network communications, although many communication implementations combine or omit one or more of the OSI layers. In OSI, the physical layer is the lowest layer which interacts directly with the network. It includes the actual bit stream transmission across the physical connections to the network. The second layer is the datalink layer which provides multiplexing and framing of the physical layer stream into messages. It also provides error detection, synchronization information and physical channel management. The third layer is the network layer which controls routing of information through the network. Services such as addressing, network initialization, switching, segmenting and formatting are provided in this layer. Sometimes acknowledgement of data delivery is accomplished in this layer; sometimes in the datalink layer.

The fourth layer is the transport layer which controls transparent data delivery, multiplexing and mapping. Reliable delivery as opposed to best effort in the layers below is accomplished by this layer if desired by the application. Services such as retransmission of missing data, reordering of data delivered out of order and correction of transmission errors are usually accomplished in this layer. The fifth layer is the session layer which uses the information from the transport layer to group pieces of data together as a common activity between two nodes in the network called a session. The sixth layer is the presentation layer which includes the interface between the session layer and the seventh layer the application layer. The presentation layer presents the information for use in the application layer without compromising the integrity of the session layer. The presentation layer provides data interpretation and format and code transformation while the application layer provides user application interfaces and management functions. The present invention is implemented largely in PPP layers which correspond closely to the OSI layers two, three and four.

WAN-based protocols, however, while layered on a conceptual basis, have often not followed this layered approach in their actual implementation. In prior implementations of PPP, for example, the entire protocol process is provided in a monolithic process operating in user space.

FIG. 1 illustrates one exemplary prior art architecture to provide the PPP functionality in UNIX based operating systems, e.g., AIXR developed by the IBM Corporation. The local system 10 communicates to remote systems 11 over the public switched telephone network 12 over a particular media technology, for example, ASYNC, Integrated Services Digital Network (ISDN), X.25 or Synchronous Data Link Control (SDLC). These messages are caught by the local system 10 by communication media mechanism 13 which possesses the specific interfaces dictated by the particular communication medium. The software portion of the communication media mechanism 13 operates in the kernel space of the operating system. A plurality of the mechanisms may exist each for a particular medium although only one is shown in the drawing. Each communication medium, mechanism will include its own device drivers each with a specified interface. The point-to-point process 15 must be able to couple to each of these interfaces to support each of the communication media.

The point-to-point protocol process 15 operates in the user space of the operating system. The point-to-point protocol process 15 establishes the physical connection; for example, it places a phone call to a remote system 11. The PPP process 15 encapsulates the network protocol data on the outgoing side by adding the PPP information and strips the point-to-point protocol data from incoming data. The point-to-point process 15 may provide the framing requirements which are specific for each communication medium mechanism to be supported. For example, the PPP process 15 may verify the integrity of the data of the incoming messages and remove any transport specific information in the packet such as octet stuffing or transport protocol headers. For outgoing messages, it would add transport specific information such as any data integrity calculations. The PPP process implements the Link Control Protocol (LCP) and the Network Control Protocol (NCP) which are subprotocols of the PPP. The LCP is used to agree on common link characteristics. The LCP handles the assignment and management of addresses which is especially difficult over switched point-to-point links. The LCP functions are handled for each instance of the communication medium by a separate copy of the point-to-point protocol process. A family of Network Control Protocols are used to establish and configure different network layer protocols. The NCPs handle negotiation of NCP characteristics, such as network addresses, for their respective network datagram protocol. Not all of the possible NCPs are typically handled by a given prior art PPP process. Network datagram support is provided by the PPP process so that network data is routed appropriately. Data destined for the remote system as the proper point-to-point information added to ensure proper routing at the remote system.

The software modules implementing the network protocols 17 operate in kernel space. In AIX, these software modules are considered parts of the operating system which allow the network applications such as hypertext transfer protocol (http), file transfer protocol (ftp) and telnet to be independent of the physical media over which communication is accomplished. For example, in the case of the Internet Protocol (IP), the IP network layer provides the interface to the socket layer so that all TCP/IP applications can transport data over point-to-point protocol connection. The network layers also serve as the interface between the communication media mechanism and the operating system network services.

Shown generally are the user processes 19 such as network applications which utilize the network services provided by the operating system.

The prior art implementations of the point-to-point protocol in a UNIX based operating system use a user space process which performs all the functions described above. As can be appreciated by the description above, the PPP process is very detailed and complicated. When a new communication mechanism is to be supported, the point-to-point process must be rewritten for the new communication mechanism. Naturally, the revision process incurs additional expense and time in the development cycle. Further, the vendor of the new communication mechanism must understand all aspects of point-to-point protocol rather than just the specifics necessary to support the new transport media. New network support also requires a similar reimplementation of the point-to-point protocol process. For example, the existing PPP software may be changed to handle new network control protocols or datagram protocols. Again, the vendor must have understanding of many aspects of point-to-point protocol, rather than just the additional support.

It is, therefore, desirable to minimize the efforts required to integrate the new communication media or network services into an operating system providing PPP for data link connections.

SUMMARY OF THE INVENTION

Therefore, it is an object of the invention to minimize the efforts required to integrate the new communication media into an operating system.

It is another object of the invention to minimize the effort required to integrate a new network service into an operating system.

These and other objects are accomplished by implementing the link control protocol layer as an operating system service multiplexing a set of network protocol connections to a set of communication media connections routing messages between respective connections. The LCP function is isolated by a set of network interfaces and a set of communication media interfaces. The invention allows the NCP and datagram support to be independent of the LCP support so long as the NCP and datagram implementations conform to the interfaces provided by the LCP operating system service that allow exchanges of state information. Also, the LCP operating system service allows the addition of new types of physical communication media support to the PPP subsystem of the present invention with knowledge only of the interfaces to the LCP layer and the framing characteristics of the communications medium. Thus, the requirements on vendors of new communications media which use PPP are greatly reduced. Further, because the LCP layer is now isolated by the interfaces, enhancements to the LCP layer become accessible to all communications media as well as to the NCP and datagram protocols without impact to the media or network layers.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM RISC System/6000 (TM) line of computers which run on the AIX (TM) operating system. The various models of the RISC System/6000 is described in many publications of the IBM Corporation for example, RISC System/6000, 7073 and 7016 POWERstation and POWERserver Hardware Technical reference, Order No. SA23-2644-00. The AIX operating system is described in General Concepts and Procedure—AIX Version 3 for RISC System/6000 Order No. SC23-2202-00 as well as other publications of the IBM Corporation.

Figure 2:
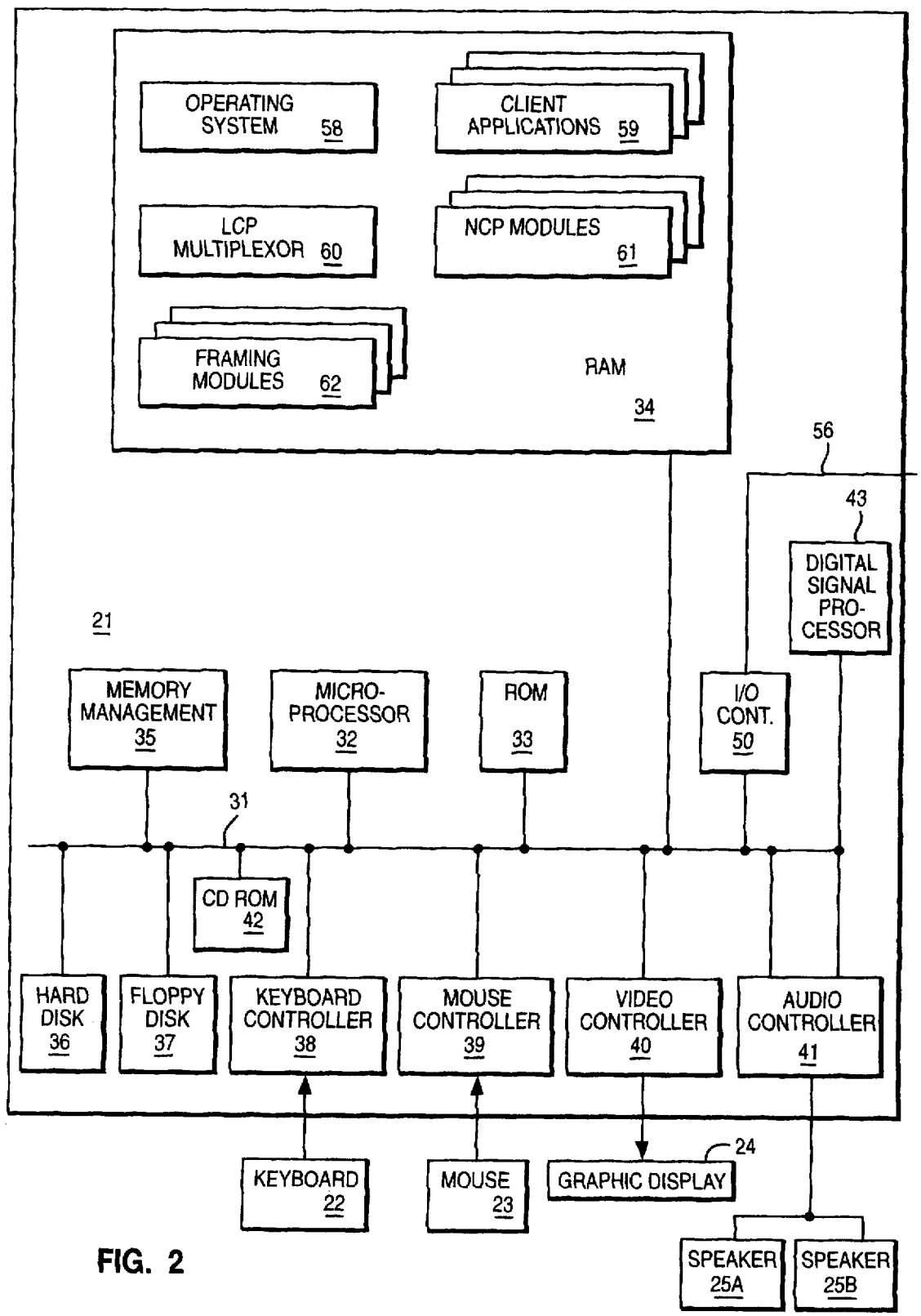
FIG. 2 depicts a computer system configured according to the teachings of the present invention.

In FIG. 2, a computer 20, comprising a system unit 21, a keyboard 22, a mouse 23 and a display 24 are depicted in block diagram form. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. Various Reduced Instruction Set Computer (RISC) microprocessors such as the Power2 chip set and the PowerPC chip manufactured by IBM are used in RS/6000 workstations. Of course, for other vendor workstation microprocessors by Hewlett Packard, Sun, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 32 also coupled to the system bus 31 is used to store a large amount of data, e.g., a multimedia program or presentation.

Also connected to this system bus 31 are various I/O controllers: The keyboard controller 38, the mouse controller 39, the video controller 40, and the audio controller 41. As might be expected, the keyboard controller 38 provides the hardware interface for the keyboard 22, the mouse controller 39 provides the hardware interface for mouse 23, the video controller 40 is the hardware interface for the display 24, and the audio controller 41 is the hardware interface for the speakers 25. An I/O controller 50 such as a Token Ring Adapter enables communication over a network 56 to other similarly configured data processing systems.

One of the preferred implementations of the invention is as sets of instructions 58–62 resident in the random access memory 34 of one or more computer systems configured generally as described above. Until required by the computer system, the set of instructions may be stored in another computer memory, for example, in the hard disk drive 36, or in a removable memory such as an optical disk for eventual use in the CD-ROM 42 or in a floppy disk for eventual use in the floppy disk drive 37. One skilled in the art would appreciate that the physical storage of the sets of instructions physically changes the medium upon which it is stored electrically, magnetically, or chemically so that the medium carries computer readable information.

Prior to the present invention, a study of the current specifications for implementing the point-to-point protocol (PPP) on various physical communications media and different network protocols was undertaken. By separating the PPP specifications for different network protocols into the separate components which accomplish the functions assigned to the PPP process, the following was observed: The method of encapsulation is always the same for all PPP protocols, i.e. LCP, datagram and NCP. The NCP and datagram protocols are dependent upon an LCP link existing. However, the LCP layer does not require that particular network control or datagram protocols be supported. Framing aspects of each PPP implementation are specific to the communication media and are best understood by the implementor of the media support.

Following these observations, the invention implements the LCP layer as a multiplexing operating system service running in kernel space rather than user space having a set of network interfaces and a set of transport interfaces. The invention allows the NCP and datagram support to be independent of the LCP support so long as the NCP and datagram implementations conform to the interfaces provided by the LCP operating system service that allow exchanges of state information. Also, the LCP operating system service allows the addition of new types of physical media support to the PPP subsystem of the present invention with knowledge only of the interfaces to the LCP layer and the framing characteristics of the communications medium. Thus, the requirements on vendors of new communications media which use PPP are greatly reduced. Further, because the LCP layer is now isolated by the interfaces, enhancements to the LCP layer become accessible to all communications media as well as to the, NCP and datagram protocols without impact to the media or network layers. Since the preferred embodiment of the LCP multiplexor is a kernel space process transitions and overhead associated with the kernel space/user space boundary are avoided.

Figure 3:
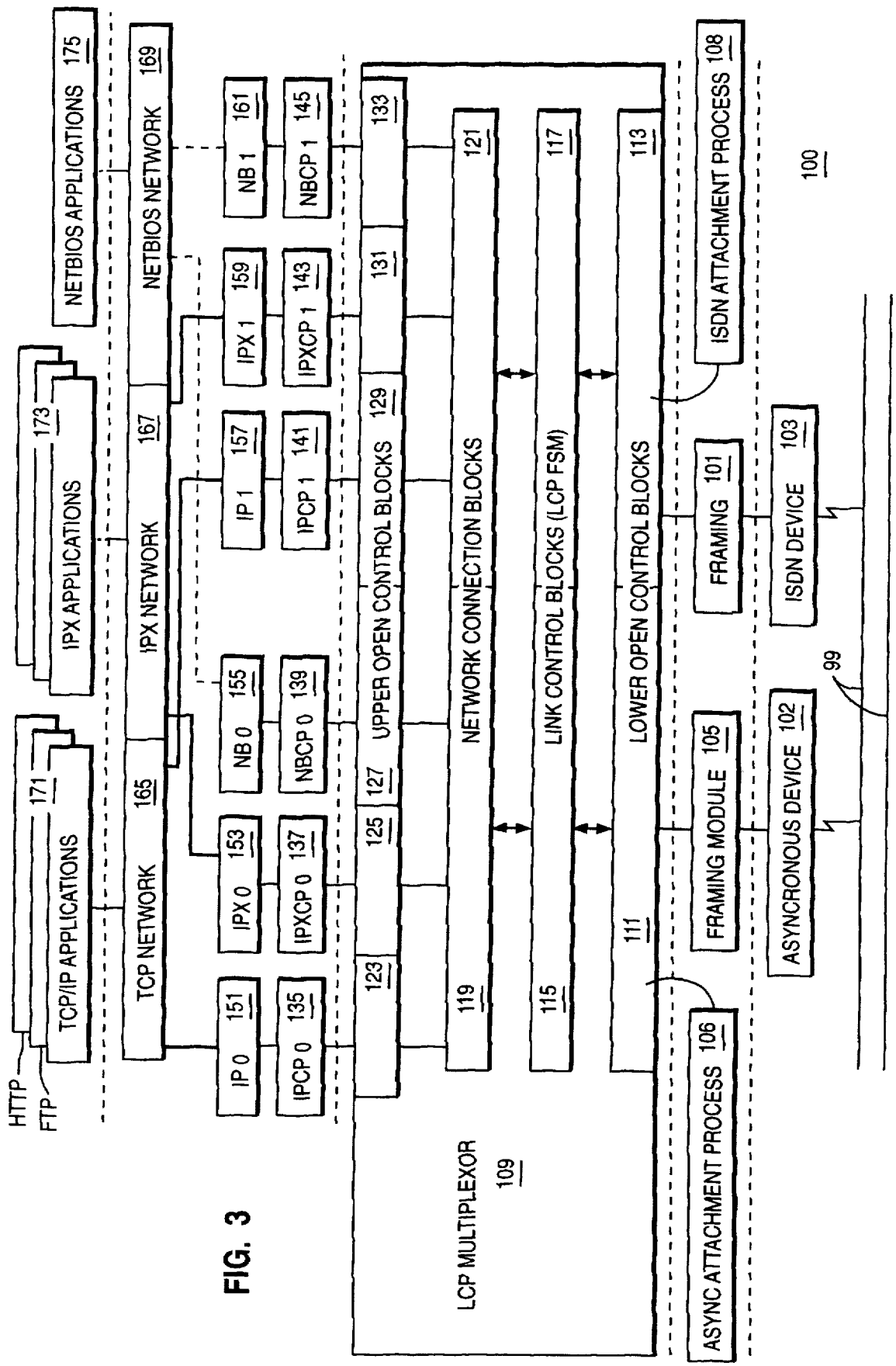
FIG. 3 illustrates an implementation of the point-to-point protocol according to the present invention.

Referring to FIG. 3, the LCP layer 109 is implemented as a multiplexor where the top half will handle interaction with the NCP and datagram protocol modules and the bottom half handles the LCP protocol and analyzes the frames from the physical communication layers. There is an instance of an LCP data structure for each bind that occurs. All of these LCP instances are managed by the LCP multiplexor. Also, it manages linking the communication media connections to the media streams to the network connections via an available network control block.

An architectural diagram of the system according to the present invention is illustrated in FIG. 3. The remote systems and communication media 99 can remain essentially untouched from the prior art architecture depicted in FIG. 1. Of course, since one object of the invention is to promote the integration of new communications media with a minimum of reprogramming effort, it is envisioned that at least some of the communications media will be new to the art when compared to those discussed in conjunction with FIG. 1. Furthermore, at least some of the remote systems can be configured as shown in this figure to take advantage of the present invention.

Communication medium access layer 100 includes device drivers which interact with a particular physical communication media. Async device driver 102 and ISDN device driver 103 are representative of the device drivers which provide the operating system interface to the physical communication media. Those skilled in the art would recognize that many device drivers could also reside in this layer such as drivers for the SONET, x.25 and Frame Relay technologies.

Separate framing modules 105 Drawing change FIG. 3 and 107 are the portions of the PPP subsystem which handle the aspects of framing associated with and specific to each media type. Certain framing modules for the more established communications media are provided as part of the base operating system. Vendors adding media support for new communications technologies can add new framing modules written to the LCP operating system service interfaces. If Protocol Field compression and/or Address Control Field Compression has been negotiated and the media type requires the PPP Address Control Field, the Framing module compresses these entities. Both incoming framing functions, e.g., removing the transport specific information, and outgoing framing functions, e.g., adding the transport specific information, are performed by these modules. These operations are well understood by those skilled in the art and are defined in PPP standards such as RFC 1661.

As a specific example, the Async framing module 105 communicates with the Async device driver 101 on outgoing messages, it encapsulates the message with a HDLC-like wrapper and performs octet stuffing using the negotiated Asynchronous Control Character Mapping. Further, the Async framing module ensures that data is transmitted in the clear and calculates a frame check sequence which is a data integrity indication.

An Asynch framing module would also add the flag bytes to the beginning and the end of the frame and compress the protocol field and address control fields if negotiated by the LCP multiplexor. On incoming messages, the reverse would be done. An ISDN framing module 107 would do considerably less since the data integrity ensuring that data is transmitted in the clear. ISDN uses a technology called "Bit stuffing" instead of "Octet stuffing", which is handled by the ISDN hardware or device driver. An Async attachment process 106 and an ISDN attachment process 108 respectively "push" the Async framing module 105 and ISDN framing module onto their respective device drivers prior to the bind to the lower interface of the LCP multiplexor 109. The attachment process may be provided as a separate user space module by the vendor of the new communications medium. After attachment occurs, they take no part in the actual communication stream, but may provide mechanisms for monitoring inactivity.

The LCP multiplexor 109 provides the operating system resources to manage media layer and network layer connections. An associated LCP protocol state machine 115, 117 is provided for each physical media stream which binds to a respective media layer connection lower control block 111, 113 on the bottom half of the LCP multiplexor 109. The lower connection 111 and 113 are instances of an access on the device driver and contain queue and other information for a respective communication media stream so that data can flow into and out of the LCP multiplexor. For every media connection 111 there is a corresponding LCP state machine 115. The state machine is also called a link control block. A pool of network layer connections 123-133 is bound to the top half of the multiplexor 109. Every network connection 123-133 is associated with a network connection block 119,121 via protocol registration. However, in a preferred embodiment, there is a preconfigured number of network connection blocks and the one to one correspondence is based on the protocols supported by that upper network protocol stream. Both the protocol state machines 115, 117 for the lower connections and the network connection blocks 119, 121 for the upper connections may be from a respective pool of available processes or may be generated dynamically as needed from a master control process. As a new network stream is registered with the LCP multiplexor, the protocol and the pointer to the upper open control block 123 are placed in the first available network control block 119. As new communication media streams are bound into the LCP multiplexor, an available instance of the LCP state machine 115 is pointed to by the lower open control block 111, and the state machine control block 115 points back to the lower open control block 111. Thus, the network and connection media connections contain the data required to pass data on the different streams.

The routing between the control blocks 111-113 and 123-133 which manage the communication streams at the upper and lower interfaces of the LCP multiplexor 109 is accomplished by the link control blocks 115, 117 and the network connection blocks 119, 121 based on the protocol specified in a frame passed to it by the framing modules 105, 107. The link control blocks 115, 117, each of which is associated with a particular physical communications medium, are responsible for the actual LCP negotiation with the peer LCP layer at the remote system, to establish a common set of link characteristics. Once the LCP negotiation is conducted, those characteristics are then passed down to the framing module (ACCM, MRU, Protocol Compression, Address Control Field Compression) The link control blocks also indicate to all network layers that the link is available for NCP negotiation. Once the NCP negotiation is successfully concluded, the link control blocks route the NCP and Datagram protocols to the appropriate network connection blocks for incoming traffic. In the event that a protocol is rejected by the peer, the link control blocks indicate to the network protocol layer that this occurred so that the particular protocol is not used by the sender any longer. If a protocol from the peer is received which is not supported by this stream, i.e. not a network protocol that a network protocol layer has registered with the LCP multiplexor, the protocol is rejected by the link control block and the peer is notified.

There may be multiple network/NCP protocols supported by each network connection block. Since each network protocol and its associated NCP have a unique PPP protocol identifier assigned, when a network stream registers with the LCP multiplexor it informs the LCP multiplexor which protocols it can bind. For example, IP may have the 0x8021, 0x0021, 0x002d, 0x002f protocol identifiers assigned to it, while IPX has 0x802B and 0x002B assigned. Other datagram protocols could have other identifiers assigned. When an IP stream registers its first protocol, it is assigned to the first network control block which does not contain that protocol identifier. If another IP interface stream gets created, it is allocated to a different network control block so that its associated IP data flows up the proper path. When the first IPX stream registers its first protocol, it similarly is bound to the first network control block which does not have that protocol registered. In this manner, when an instance of a media stream binds to the lower half of the multiplexor and consequently gets bound to a network control block, the system now will have the ability to transport both IP and IPX datagram protocols over the same communications media.

The LCP multiplexor 109 also controls passing LCP state information to the NCP modules 135-145 described below. Through a defined set of messages, the LCP multiplexor 109 indicates transitions between states of the LCP layer to the NCP modules 135-145 so that the NCP processing can be initiated or reset back to an inactive state. For example, messages flow between the Network layer, NCP modules and LCP multiplexor when a communication medium binds to the LCP multiplexor. The LCP state transitions are defined by the PPP RFC's. The messages sent by the LCP multiplexor indicate changes in state are discussed in greater detail below. Finally, the multiplexor 109 restricts the flow of the different PPP protocols based on the state of the instance of the link control block that is associated with the physical media layer and a specific net connection to an NCP module. State refers to the current state of a particular layer. The LCP layer, for example, starts in the OPEN state. When it has completed establishing common characteristics with the remote system, the LCP layer moves to the NETWORK state.

The PPP subsystem contains a plurality of NCP modules 135-145, each handling the NCPs for a specific network protocol for a specific network. After LCP negotiations conclude, the NCP modules 135-145 perform the required negotiations with remote peers. The NCP protocols may have multiple states to go through before actual network traffic can flow. As shown, separate internet protocol streams are handled by IP NCP modules 135 and 141, while separate IPX streams are handled by IPX NCP modules 137 and 143 and separate NetBios streams are handled by NB NCP modules 139 and 145. Each NCP module is registered with the LCP multiplexor 109 indicating what NCP protocols it manages. After successful NCP negotiation, the NCP modules 135-145 are involved with the receipt and transmission of network datagrams. On receipt, the NCP module removes the PPP network datagram protocol identifier and passes it to its respective network protocol stack 151-161. For transmission of a network datagram, the NCP module adds the PPP network datagram protocol to the frame and passes it down to the LCP multiplexor to be sent out over the communications medium.

In the preferred embodiment, each instance of a network protocol 151–161 is associated with its own instance of an NCP module 135–145. The communication streams for a particular protocol are sent through a network API layer such as a sockets API in a UNIX-based operating system. The TCP sockets API 165 handles streams from the two IP stack 151, 157, the IPX API 167 handles streams from the IPX stacks 153, 159 and the NetBios API layer 169 handles communication from the NetBIOS stacks 155, 161. Each network protocols stack for a particular network protocol supported by the PPP subsystem for a particular media communication stream. The IP stacks 151–157, the IPX stacks 153, 159 and the NetBIOS stacks 155, 161 are all well known protocols in the prior art. The internet protocol implementation for PPP is described in RFC 1332 of the IETF, for example. The invention also envisions new protocol implementations because of the ease of which they can be accommodated by the present invention. The instances of the PPP network streams are created when the PPP subsystem is started which usually occurs at boot time. A master control process is run which installs the appropriate modules and configures the IP data streams. Each network layer will have its own control processes which will be started by the master control process.

Figure 1:
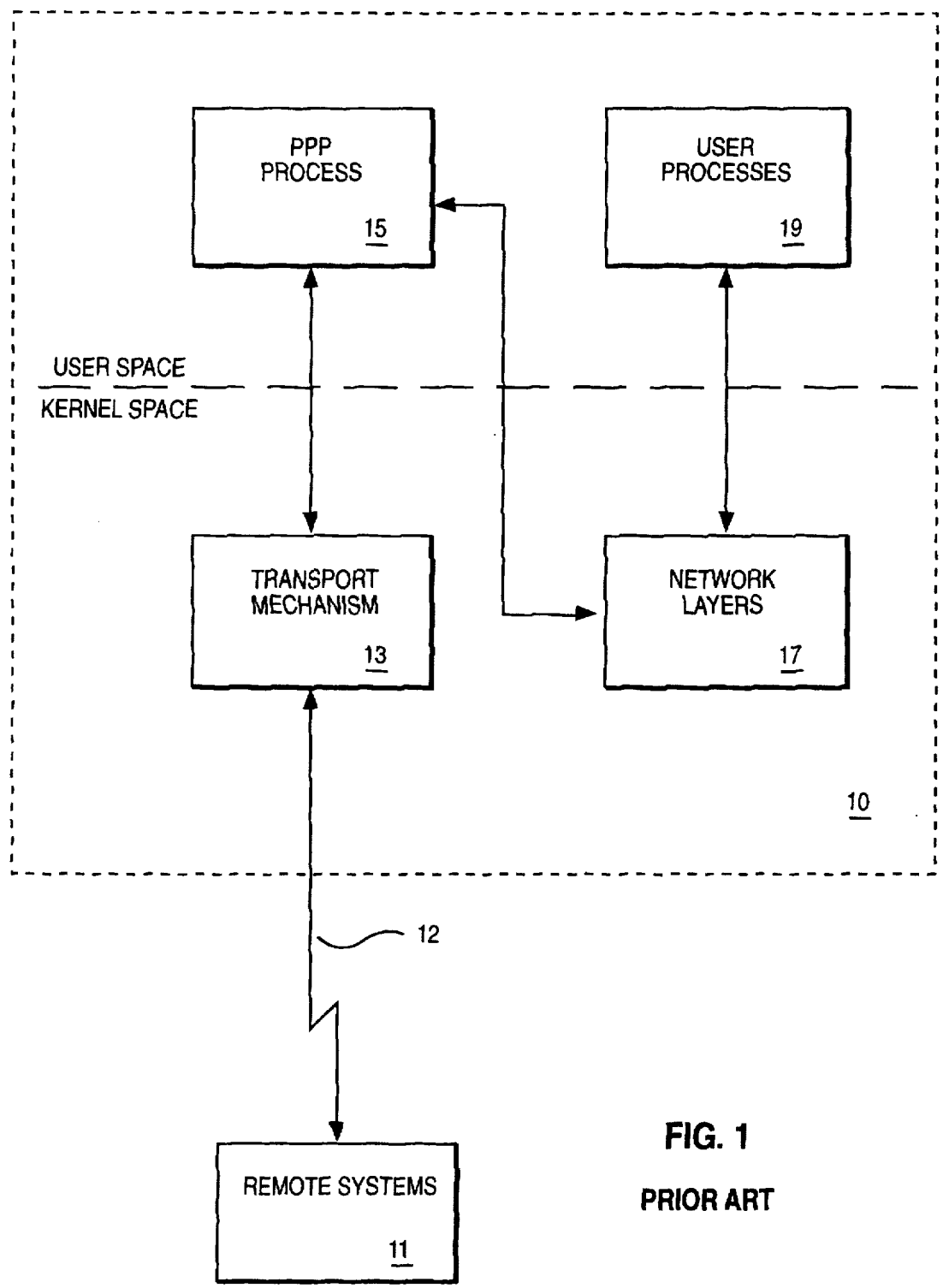
FIG. 1 illustrates a prior art implementation of the point-to-point protocol.

The applications 171, 173, 175 in user space use the network services of the present invention, e.g., http, and these applications can be basically similar in architecture to those discussed in reference to FIG. 1.

Figure 4A:
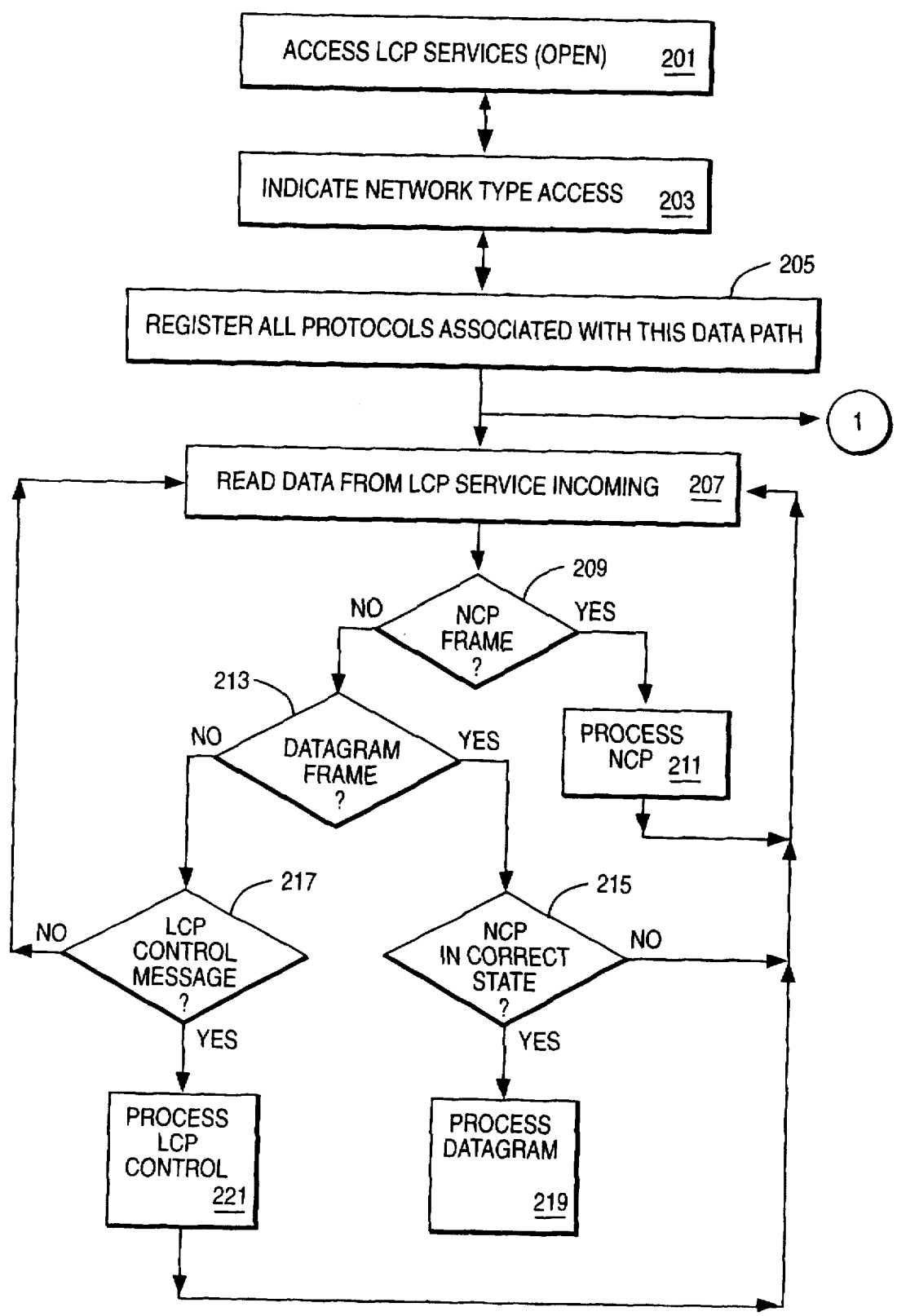
FIGS. 4A–4B are flow diagrams which illustrate the process by which a new network control protocol or datagram implementation registers to the point-to-point protocol subsystem.

FIG. 4A shows how a new NCP/datagram implementation would perform the binding and registration process to install itself into the PPP subsystem as well as handling control messages. In step 201, the NCP module would access the LCP multiplexor. How this access is accomplished is operating system dependent. For example, in the preferred embodiment, a UNIX streams implementation would do an "open" command on the LCP multiplexor. In step 203, the NCP module would indicate to the multiplexor that this access is an upper/network protocol access as opposed to a lower/media access. The NCP module registers each PPP protocol which is handled on this access path in step 205. Typically, these would be the set of NCPs and associated network datagram protocols for a particular network protocol. The first registration of an NCP module which supports a particular network protocol binds to the first available network control block instance that does not already support the network protocol. This allows multiple datagram support for multiple interfaces. The rest of the operation in the figure illustrates the high level handling of the NCP. Network datagram and LCP control messages. For data flowing up stream from the LCP multiplexor, step 207 reads the incoming data from the LCP multiplexor. In step 209, a test is performed to determine whether the data element is an NCP frame. If so, the NCP frame is processed in the NCP module in step 211.

If the test in step 209 is negative, the test in step 213 determines whether the data element is a datagram frame. If so, the test in step 215, determines whether the NCP module is in the correct state. For example, agreement on all options by both peer systems must be reached and the NCP module must be in the opened state. If so, the datagram is processed and sent up to the protocol. If the data element is neither an NCP frame or a datagram frame, the test in step 219 determines whether it is an LCP control message. If so, in step 221, the LCP control message is processed. For example, the LCP control message may indicate that the data link has been terminated so the NCP module should transition from an open to a closed state. The NCP module continues to listen for new data from the LCP multiplexor, step 207, at the conclusion of these activities. The NCP module remains until is removed from the operating system. When the LCP multiplexor transition into the DOWN state, it indicates that via control messages to the NCP module at which time the NCP module no longer allows datagram traffic to flow.

Figure 4B:
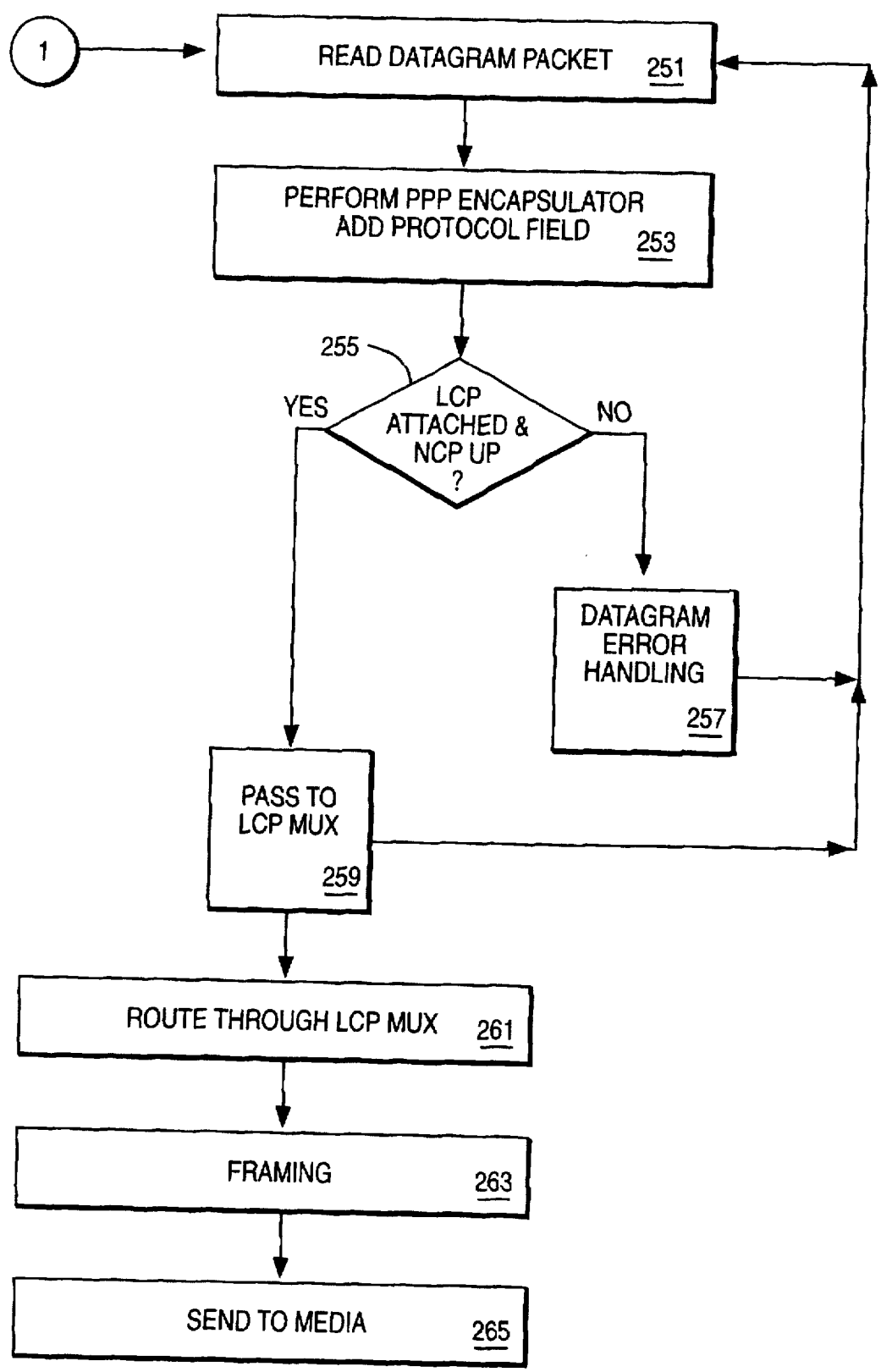

FIG. 4B illustrates handling of data in the NCP module going down stream from the network protocol stack. First, in step 251, it reads the datagram received from the protocol stack. In step 253, the NCP module must encapsulate the datagram, placing the appropriate PPP datagram protocol onto the frame. PPP encapsulation is described in the PPP RFCs.

In step 255, a test is performed to verify that the NCP is in the appropriate state, i.e. traffic can flow and pass the datagram downstream to the LCP multiplexor. For example, if the system was configured to allow a single network layer stream, i.e. 1 of each type of datagram supported and an attempt to set up a second network layer stream, e.g., a second TCPIP interface the registration would fail. Referring to FIG. 3 which shows a configuration supporting two network streams of each type, a third attempt to set up an IP stream would fail to register, since a network control block was not available with which to associate. Step 257 would perform the necessary error handling, i.e. informing the protocol stack that the connection cannot be made and so forth. If the connection is in the proper state, the encapsulated datagram is sent to the LCP multiplexor in step 259. The encapsulated datagram is routed through the LCP multiplexor through the network protocol handler and the network control block to the link control block, step 261. Next, the datagram is routed to the appropriate framing module where framing occurs, step 263, as described above. In step 265, the encapsulated and framed datagram is sent to the communications media for transport over the data link to the peer.

Figure 4C:
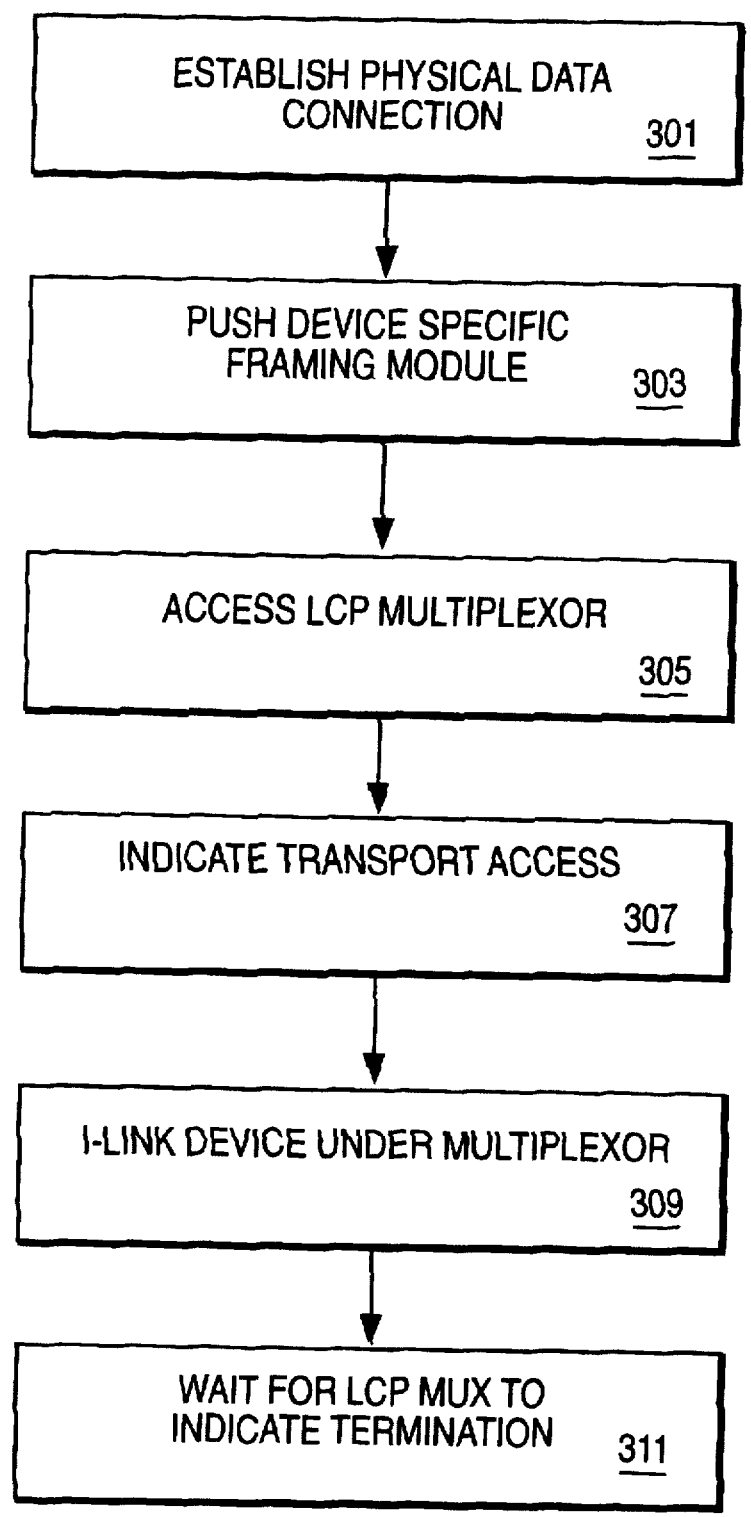
FIG. 4C is a flow diagram which illustrates the process of connecting a transport both through the point-to-point protocol subsystem.

As depicted in FIG. 4C, when support for a new communications medium is to be added, the following steps are performed in the physical communication medium registration process. In the preferred embodiment, an attachment process pushes the framing module into the device driver. In step 301, the physical connection with the peer system is established, i.e. place a phone call, listen for an incoming call and so forth by the device driver. In step 303, a framing module is pushed on to the device driver. This is a standard procedure in AIX where the "pushed" module modifies the data in some manner prior to passing it up to the next level or down to the driver. Thus, the framing module, handles the framing modifications that have to be performed on the data in both directions. One skilled in the art would appreciate that the process would be quite different for other operating systems. In step 305, the LCP multiplexor is accessed by the attachment process. In step 307, the attachment process indicates to the LCP multiplexor that this is a lower access or communication media access. In step 309, the communication medium is linked to a lower open control block in the LCP multiplexor. For example, a UNIX streams implementation would use an ILINK IOCTL command to perform this attachment step. The LCP data starts to flow and be received at this time. The process enters a wait state step 311. When the LCP negotiations by the LCP multiplexor are completed, the LCP multiplexor will allow NCP and network data to flow up to the appropriate protocol handlers which were registered with the upper half of the multiplexor.

In the preferred embodiment, the attachment process handles inactivity timeouts and manages the non PPP related aspects of the device driver.

Figure 5:
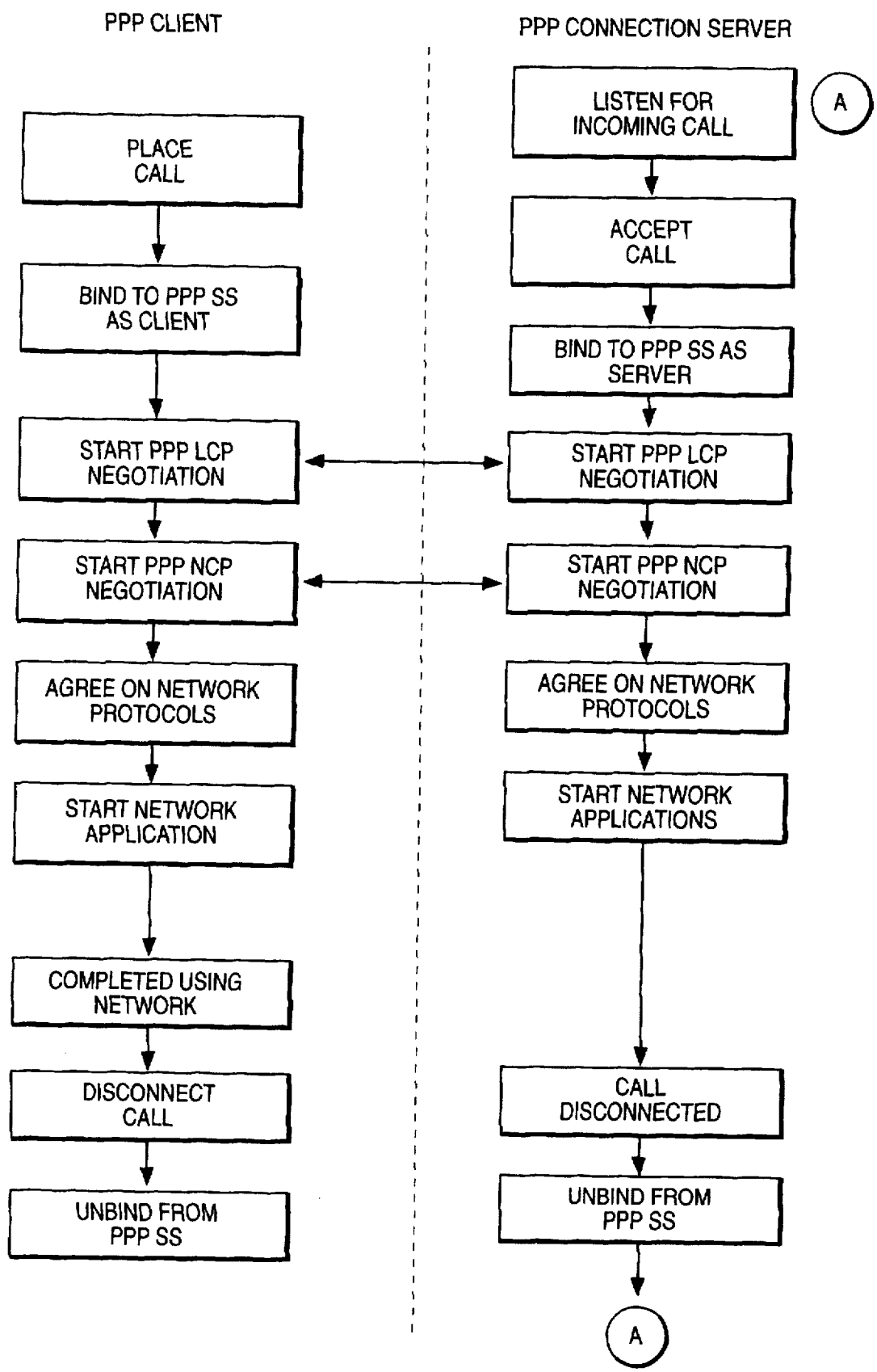
FIG. 5 illustrates an incoming flow scenario between a point-to-point client and a point-to-point protocol server.

FIG. 5 illustrates the flow between a PPP client and a PPP server. On the client side, the modules below the LCP multiplexor, in the preferred embodiment the attachment process, are responsible for placing a call to the remote peer, in this case, the server. On the server side, the peer functions below the server LCP multiplexor listen for the incoming call, when it comes the call from the client is accepted. At this time at both the client and the server, the respective attachment processes bind to the LCP multiplexor as client and server processes respectively. Next, the LCP negotiation is conducted by the LCP multiplexors at the client and server machines. Assuming agreement about the LCP characteristics is reached, the NCP negotiations between the various NCP modules which are coupled to the tops of the LCP multiplexors are conducted. Assuming that computible network protocols registered at each system, the communication paths are established through the LCP multiplexors. At this time, network applications can conduct communications between client and server. At the client machine, when the user has completed using the network, a command is issued to disconnect the call which is sent to the server machine. At both machines, the lower layers are unbound from the LCP multiplexor as the call is disconnected.

As mentioned above, to attach a new communication medium to the LCP multiplexor, an attachment process is needed which in the preferred embodiment is run as a daemon. The attachment process establishes the connection with the multiplexor and device stream which includes the framing module, completing the connection with a peer in the remote system. In the preferred embodiment, the device driver is a Streams Device which conforms to the UNIX System V Release 4 streams specification. The attachment process utilizes the I_LINK function to link the stream associated with the device driver to the LCP multiplexor. Messages are passed by modules such as the LCP multiplexor and the communication medium driver via the STREAMS function in the operating system.

To perform the I_LINK streams function, the attachment process must have 2 streams open, one stream on the device, the device stream, and one stream to the LCP multiplexor, the multiplexor stream. Prior to linking under the multiplexor, the multiplexor stream must be initialized. In a preferred embodiment, there are 2 mandatory initialization operations and several optional operations. As the LCP multiplexor is expecting a particular order of events from the attachment process, the order in which these operations are performed is important and should be preserved. An I_LINK would fail if the open type was not set to a lower open and the type of network connection block to associate this link was not set in the open flags.

The attachment process is responsible for building the multiplexor stream from the device driver below the multiplexor. The attachment process accesses the device stream, pushing the frame module onto the device stream and links the device stream under the LCP multiplexor to build the multiplexor stream.

As mentioned above, modules in the NCP layer and the framing layer will exchange information with the LCP multiplexor via a set of defined messages which provide the upper lower interfaces. There are 2 classes of LCP Control messages: those which convey information to the NCP network datagram layers, and those which convey information to the framing module about link characteristics. These will be described in greater detail below. Some of these messages are sent to the NCP modules by the LCP multiplexor to indicate changes in state so the NCP layer can determine if datagram data can be transmitted and received. In other words, once the LCP configuration is agreed upon by the local and remote systems, the LCP multiplexor will indicate that NCP data can flow for the NCP negotiation.

Interaction with the LCP multiplexor by the framing modules and the NCP modules is accomplished through a set of primitives and associated control structures. In one preferred embodiment, some of the primitives are implemented as transparent STREAMS ioctls, others require the use of the I_STR ioctl, and still others are implemented utilizing M_PROTO messages. Those skilled in the art would understand that many other primitive implementations are possible which do not use STREAMS for passing messages.

These primitives which make up the interface into the operating system service fall into the following categories: (1) attachment Process requirements to bind the framing modules to the Lower half of the LCP multiplexor. (2) control messages to the framing modules from the LCP multiplexor, (3) network stream establishment primitives for building the network layers above the LCP multiplexor and (4) control messages from the LCP multiplexor to the NCP modules and network protocol layers.

The responsibility of establishing the connection with the remote peer is specific to the communication media and the implementation of the device driver. Thus, the new media implementor should provide the physical media attachment process as part of the framing module and device driver package. After the connection has been made, and the multiplexor stream has been opened, the attachment process must inform the multiplexor that it is an attachment_open. In one preferred embodiment, this may be done via the LCP_SET_OPEN_TYPE ioctl primitive with the parameter LCP_ATT_OPEN described below. The attachment process must then indicate to the LCP multiplexor the type of link it will be requesting, i.e. server or client links. In the preferred embodiment, this is done via the LCP_SET_OPEN_FLAG ioctl with a parameter of CLIENT_OPEN to request a client link or a parameter of SERVER_OPEN to request a server link.

Once the basic configuration of the multiplexor stream has been established, the attachment process may then override the default LCP options by issuing a I_STR ioctl which contains the ATT_OVERRIDE command and passes as its data pointer the address of an override structure. In the preferred embodiment, this step is optional, however, in a mixed a synchronous—synchronous connection environment, the LCP defaults would probably be tuned to the asynchronous side. Therefore, the synchronous attachment process would override the asynch_character mapping as well as eliminate protocol and acf compression.

After I_LINKing the device stream under the multiplexor stream, the attachment process receives an asynchronous message from the LCP multiplexor for the link to which the device stream is bound. The message will contain the link id number which was allocated at the time the I_LINK occurred.

Several ioctls relate to the binding of a physical media stream to the LCP multiplexor. The ioctl LCP_SET_OPEN_TYPE primitive informs the LCP multiplexor about the type of operations which will be allowed on this particular stream as well as the mechanism for binding the stream to a particular link control block instance. Attachments are bound via I_LINK ioctl, and upper protocols are bound by registering the protocol with the LCP multiplexor. The LCP_ATT_OPEN parameter specifies an attachment open. An attachment open, refers to the access to the multiplexor which will result in an physical media stream being bound under it.

The ioctl LCP_SET_OPEN_FLAG primitive specifies the type of link within the LCP multiplexor to which the stream should bind. This is the link type on the local system, defining the link behavior on the system which the process is running on. The CLIENT_OPEN parameter binds the stream to a client link within the LCP multiplexor. The SERVER_OPEN parameter binds the stream to a server link within the LCP multiplexor. The DEMAND_OPEN parameter indicates that the attachment process wants to bind to a specific network interface which is set in the LCP by the LCP_DEMAND—BIND ioctl.

The ioctl ATT_OVERRIDE primitive allows the attachment process to override the default LCP options, such as type ato_t and allows for the override of the acm, mru, pcom and acf options. Overriding one of these options, indicates that for a particular session the options will not be negotiated. All of these options are characteristics of the link that are negotiated as part of the LCP protocol negotiation. This information is needed by the framing module to perform error checking and framing operations. These options are all terms defined by the PPP specifications. ACM refers to Asynchronous Control Character Mapping which defines in the Async world what octets are octet stuffed. MRU stands for the Maximum Receive Unit which represents the largest amount of data that can be received on this link. PCOM—stands for the protocol field compression; network datagram protocols can have their first octet stripped off by the framing module if the peers agree to this. ACF—Address Control Field compression. Part of the framing defines an Address and Control fields, these can be taken off if the peers agree.

The ioctl I_LINK primitive is a standard streams ioctl which is used to link the stream to a particular connection in the LCP multiplexor.

The ioctl AUTH_SET_ID primitive sets information for authentication for the current link including the type(s) of authentication specified. The IN_PAP_AUTH and IN_CHAP_AUTH parameters define whether the system is acting as an authenticator. The OUT_PAP_AUTH and OUT_CHAP_AUTH parameters define whether the system will authenticate with the remote system as a peer.

The ioctl LCP_DEMAND_BIND primitive sets the network interface in the LCP multiplexor. Demand bind to a specific network interface is by a parameter to this IOCTL identifying which network connection block to link to within the multiplexor. The network connection block must have been configured as a DEMAND block by the initialization of the subsystem.

The ioctl LCP_GET_LINK primitive retrieves the link ID number to which this session was bound by the I_LINK primitive.

In one preferred embodiment, some of the LCP primitives are sent in the form of M_PROTO messages from the LCP multiplexor attachment process. Any upstream M_PROTO messages arriving into LCP the multiplexor which are not recognized by the multiplexor will be passed to the attachment process. Through this mechanism, the device driver can send information to the attachment process. Since the attachment process still exists, and there is a stream path from the multiplexor to the attachment process anything from the stream below the multiplexor which is not recognized as part of the PPP subsystem is passed over the attachment process.

Asynchronous messages from the LCP multiplexor are sent to the physical media attachment process. The PPP_HANGUP message is an indication that the LCP multiplexor is dropping the connection on the link. It is sent whenever the device driver sends a M_HANGUP message upstream, as well as when the master control process terminates to force all attachment processes to die.

The PPP_PULSE message provides the attachment daemon with the knowledge that traffic is flowing on the connection. Attachment processes can use the message to provide inactivity timeout capability.

The PPP_NET_ASSIGNED message from the LCP multiplexor to attachment process which indicates the network protocol stack to which the framing module as successfully bound.

The PPP_NET_FAILURE message from the LCP multiplexor to attachment process indicates that it was unable to bind to a network connection.

The LCP multiplexor expects that a device driver must indicate termination of the connection with a M_HANGUP streams message which is converted to a PPP_HANGUP control message by the LCP multiplexor and passed to the attachment process. In the preferred embodiment, it also expects that M_DATA messages to the driver must be contained in a single MBLK. It is also the responsibility of the framing modules below the LCP multiplexor to ensure that the incoming frame does not exceed the MRU. The LCP multiplexor expects frames which start with the PPP protocol field in its entirety. If protocol field compression is negotiated, the framing module below the LCP multiplexor is informed with the PPP_SET_PCOMP_ON message. The framing module is responsible for ensuring that if the protocol field is compressed that the first byte of 0x00 is added to the frame prior to being passed upstream to the LCP multiplexor. No data is passed in the PPP_SET_PCOMP_ON message. Protocol compression is turned off with the PPP_SET_PCOMP_OFF message.

One of the options that can be negotiated by the LCP layers is Address Control Field Compression. If ACF is negotiated, the framing module is informed by the PPP_SET_OFF message. For the framing module to ensure that the MRU is adhered to, the MRU is passed to it by the PPP_SET_MRU message. By definition of the PPP RFC's, PPP implementation must always be able to accept 1500 bytes of data regardless of the MRU. If an Asynchronous Control Character Mapping (ACCM) has been negotiated the framing layer is informed via the PPP_SET_TX_ACM and PPP_SET_RC_ACCM messages (TX for the transmission ACCM and RC for the receive ACCM).

In the preferred embodiment, all network layer streams are established at the time that the PPP subsystem needs to have a control process which establishes the streams on top of the LCP multiplexor. In the preferred embodiment, installation of the subsystem and creation of the TCP/IP interfaces is performed by a control daemon. Other network layers would provide their own control processes which would use a set of primitives and ICCTLs to build the relationship with the PPP subsystem. After a network control process accesses the LCP multiplexor, it will perform the LCP_SET_OPEN_TYPE ioctl with the LCP_UPPER OPEN parameter indicating that this is a network open. The LCP_SET_OPEN—FLAG ioctl is then issued indicating the type of network connection that this open is associated with (SERVER, CLIENT, DEMAND). After which each protocol that will be supported by this stream is registered by the LCP_PROTO_REGISTER ioctl. The first protocol registered creates the association to a network control block in the LCP multiplexor. The network control block with which this open stream is associated is the first which does not have this particular protocol registered and is of the proper type corresponding to the LCP_SET_OPEN_FLAG ioctl. At this time, the network stream is established with regards to the LCP multiplexor.

Upon establishment of a transport connection and an LCP link, the network stream will receive several messages from the LCP multiplexor indicating state changes. When a PPP_LOWER_UP message is received this is an indication that the LCP is starting its negotiations, no NCP or network datagram frames can flow at this time. When the PPP_LOWER_OPEN message is received, the NCP protocol negotiation can flow. When NCP protocol negotiation is complete network datagram traffic may flow also. Termination of the ability to send data from the network layer is indicated by the PPP_LCP_DOWN message indicating that the LCP link is no longer valid.

In the event that the remote system does not support a protocol, it will reject the protocol at its LCP layer. Upon receipt of the rejection, LCP multiplexor will send a PPP_PROTO_REJ message to the appropriate network stream, at which time that layer will cease to send any traffic, as if the LCP multiplexor indicated that it was down.

The network layers stay in existence as long as the PPP subsystem is installed in the system. They continue to be allocated to transport connections by the LCP multiplexor on a first available basis.

By providing a system interface to the PPP subsystem, a communication media implementor only has to provide the following: a device driver to the new communications medium, a framing module to properly frame the data being transmitted over the transport medium and a registration mechanism to connect the data flow to the LCP multiplexor.

Similarly, by providing a network interface to the PPP subsystem, an implementor of a new network protocol need only provide an NCP module and a registration process. The NCP module handles the NCP protocol specific to the new network protocol and passes data between the network layer and the multiplexor. The registration process registers the protocol support with the LCP multiplexor and processes LCP state change information to enable the NCP/Datagram traffic to flow at the appropriate time.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Much of the implementation in the preferred embodiment described above is specific to a streams implementation in a UNIX based operating system. Those skilled in the art would readily appreciate that other operating system without a streams environment would use other mechanisms for message passing and registration with the LCP multiplexor. Therefore, changes in form and detail may be made therein without departing from the spirit and scope of the invention as set forth in the accompanying claims.

We claim:

1. A system for communicating via PPP over a dynamic data link, comprising:
    a memory for storing sets of instructions for carrying out the PPP communication;
    a processor for executing the sets of instructions; and
    a link control protocol multiplexor operating in the operating system kernel space having a plurality of network connections for a plurality of network protocol streams and a plurality of communication media connections for a plurality of communication media streams, a means of establishing a communication path between a respective network connection and a respective communication media connection and means for informing each network connection that a communication path has been established so that communication over the network can take place, wherein the link control protocol multiplexor handles link control protocol (LCP) tasks for PPP communications for applications running in the memory.

2. The system as recited in claim 1 further comprising:
    a plurality of device drivers each handling at least one communication media stream from a physical communication medium; and
    a plurality of framing modules each for handling framing tasks for a respective device driver coupled to a respective communication media connection.

3. The system as recited in claim 2 further comprising a plurality of attachment means for each coupling a respective framing module and device driver to a respective communication media connection of the link control protocol multiplexor.

4. The system as recited in claim 1 further comprising:
    a plurality of network protocol stacks each for handling a respective network protocol, each network protocol stack coupled to a respective application interface; and
    a plurality of network control protocol modules for handling network control protocol (NCP) tasks for PPP communications for a respective network protocol stack, each network control block module coupled to a respective network connection of the LCP multiplexor.

5. The system as recited in claim 4 wherein the LCP multiplexor further comprises a plurality of link control blocks each for handling the LCP tasks for a respective communication media stream and a plurality of network connection blocks for routing messages to and from a set of network control protocol modules from and to the link control blocks.

6. The system as recited in claim 5 wherein the network control protocol modules further comprise means for handling network datagram packets for its respective network protocol stack once NCP negotiations are successfully concluded with a remote peer and means for registering with a network connection block the network protocols handled by the network control protocol module.

7. A method for communicating via PPP over a dynamic data link, comprising the steps of:
    coupling a device driver and a framing module to a communication media connection of a link control protocol multiplexor, wherein the link control multiplexor is an operating system service operating in kernel space;
    registering the network control protocol module with the link control protocol multiplexor binding the network control protocol module to a respective network connection of the link control protocol multiplexor;

establishing a communication path between the communication media connection and the network connection;

negotiating link control protocol (LCP) characteristics for a connection with the remote peer by the link control protocol multiplexor;

informing the network control protocol module that a communication path and LCP characteristics have been established;

negotiating network control protocol (NCP) characteristics for the connection by the network control protocol; and communicating with the remote peer over the data link using the negotiated LCP and NCP characteristics.

8. A method for adding a new communication medium for PPP communication to an operating system including a link control protocol multiplexor operating system service operating in kernel space which conducts link control protocol tasks for a plurality of network protocol streams and a plurality of communication media streams coupled to the link control protocol multiplexor by respective pluralities of network and communication media connections, further comprising the steps of:

coupling a device driver which handles at least one communication media stream from a physical communication medium and a framing module which handles framing tasks for the communication media stream to a communication media connection;

negotiating link control protocol characteristics by the link control protocol multiplexor; and sending the negotiated link control characteristics to the framing module.

9. A computer program product in a computer readable medium for causing a local computer system to communicate via PPP over a dynamic data link, comprising:

link control protocol (LCP) multiplexor means for negotiating LCP characteristics for all PPP communication with the remote peers, the LCP multiplexor means having a plurality of network connections and a plurality of communication media connections and once installed in the computer operates in kernel space as an operating system service;

means for causing the local computer system to bind device drivers to respective communication media connections;

a plurality of network control protocol (NCP) means for causing the local computer system to negotiate NCP characteristics for respective network protocols;

means in the LCP multiplexor for informing network control protocol means that a communications path and LCP characteristics have been negotiated; and means for causing the local computer system to bind each network control protocol means to a respective network connection.

* * * * *

UNITED STATES PATENT AND TRADEMARK OFFICE
CERTIFICATE OF CORRECTION

PATENT NO : 5,894,557
DATED : April 13, 1999
INVENTOR(S) : Steve Allen Bade and Kyusun Chang It is certified that error appears in the above-identified patent and that said Letters Patent are hereby corrected as shown below:

Face Page line [54] in the Title delete "Flexible Point-To-Point Protocol Framework" and insert therefor --Point-to-Point Protocol Framework Having Link Control Protocol Layer Operates In OS Kernal Space and Informs Upper/Lower Layers of Established Communication Path and LCP Characteristics--.

Col. 2, line 26 delete "AIXR" and insert therefor --$AIX^R$ --.
Col. 12, line 49 delete "a synchronous" and insert therefor --asynchronous--.

Signed and Sealed this

Eighth Day of February, 2000

*Attest:*

Q. TODD DICKINSON

*Attesting Officer*  *Commissioner of Patents and Trademarks*